(12) United States Patent
Ou et al.

(10) Patent No.: US 12,099,573 B2
(45) Date of Patent: Sep. 24, 2024

(54) DATA CLASSIFICATION METHOD USING QUANTUM COMPUTER, QUANTUM COMPUTER SYSTEM, AND CLASSIFIER TRAINING METHOD OF QUANTUM COMPUTER SYSTEM

(71) Applicant: Tencent Technology (Shenzhen) Company Limited, Guangdong (CN)

(72) Inventors: Songlian Ou, Shenzhen (CN); Changyu Hsieh, Shenzhen (CN); Shengyu Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 462 days.

(21) Appl. No.: 17/476,754

(22) Filed: Sep. 16, 2021

(65) Prior Publication Data

US 2022/0058435 A1 Feb. 24, 2022

Related U.S. Application Data

(63) Continuation of application No. PCT/CN2021/073645, filed on Jan. 25, 2021.

(30) Foreign Application Priority Data

May 25, 2020 (CN) .......................... 202010446946.6

(51) Int. Cl.
*G06F 18/214* (2023.01)
*G06F 15/16* (2006.01)
(Continued)

(52) U.S. Cl.
CPC ............ *G06F 18/214* (2023.01); *G06F 15/16* (2013.01); *G06F 18/2411* (2023.01); *G06N 10/00* (2019.01)

(58) Field of Classification Search
None
See application file for complete search history.

(56) References Cited

U.S. PATENT DOCUMENTS 10,776,232 B2    9/2020   He et al.
11,748,665 B2 *   9/2023   Gambetta .............. G06N 20/10
                                                      706/12

(Continued)

FOREIGN PATENT DOCUMENTS

CN    104504601 A    4/2015
CN    106650808 A    5/2017

(Continued)

OTHER PUBLICATIONS

Search Report for Application No. CN 202010446946.6 dated Dec. 10, 2021, 3p, in Chinese language.

(Continued)

*Primary Examiner* — Tahmina N Ansari
(74) *Attorney, Agent, or Firm* — Crowell & Moring LLP

(57) ABSTRACT

A data classification method and system, and a classifier training method and system are disclosed in the embodiments of the present disclosure, belonging to the field of artificial intelligence (AI), cloud technologies, and quantum technologies. The method includes: providing to-be-classified data to a quantum computer; performing feature mapping on the to-be-classified data by using a quantum circuit to obtain a quantum state of the to-be-classified data; determining an estimation result according to a boundary vector of a classifier, the quantum state of the to-be-classified data, and a quantum state of index information corresponding to the boundary vector; transmitting the estimation result to a classical computer. The quantum state of the index information refers to a superposition of feature maps of training data used by the classifier during training; and determining (Continued)

a classification result corresponding to the to-be-classified data according to the estimation result.

20 Claims, 6 Drawing Sheets

(51) Int. Cl.
    *G06F 18/2411*    (2023.01)
    *G06N 10/00*    (2022.01)

(56) References Cited

U.S. PATENT DOCUMENTS

| | | | |
|---|---|---|---|
| 2009/0027442 A1* | 1/2009 | Silverbrook | B41J 2/16535 347/20 |
| 2009/0087084 A1 | 4/2009 | Neigovzen et al. | |
| 2017/0364796 A1 | 12/2017 | Wiebe et al. | |
| 2020/0005154 A1 | 1/2020 | Herbster et al. | |
| 2020/0320437 A1* | 10/2020 | Gambetta | G06N 10/00 |
| 2021/0095971 A1* | 4/2021 | Mao | G01C 21/32 |
| 2021/0312047 A1* | 10/2021 | Chen | H04L 9/0858 |
| 2022/0058435 A1* | 2/2022 | Ou | G06F 18/214 |

FOREIGN PATENT DOCUMENTS

| | | |
|---|---|---|
| CN | 107004162 A | 8/2017 |
| CN | 107092931 A | 8/2017 |
| CN | 108414923 A | 8/2018 |
| CN | 108921049 A | 11/2018 |
| CN | 109242223 A | 1/2019 |
| CN | 110909796 A | 3/2020 |
| CN | 111079704 A | 4/2020 |

OTHER PUBLICATIONS

First Office Action for application No. CN 202010446946.6 dated Dec. 17, 2021, 4p, in Chinese language.

Japanese Notification of reasons for refusal for corresponding application No. JP 2021-553843 dated Nov. 14, 2022, 3p, in Japanese language.

English language translation of Japanese Notification of reasons for refusal for corresponding application No. JP 2021-553843 dated Nov. 14, 2022, 4p.

Park, Daniel K. et al., "The theory of the quantum kernal-based binary classifier", Apr. 7, 2020, pp. 1-15, Internet: <URL: https://arxiv.org/pdf/2004.03489v1.pdf>.

Shuld, Maria et al., "Quantum machine learning in feature Hilbert spaces", Mar. 18, 2018, pp. 1-12, Internet: <URL://arxiv.org/pdf/1803.07128v1.pdf>.

Rebentrost, Patrick et al., "Quantum support vector machine for big data classification" Jul. 10, 2014, Part 1, pp. 1-5, Internet: <URL: https://arxiv.org/pdf/1307.0471v3.pdf>.

Extended European Search Report for corresponding European application No. EP 21759226.0 dated May 3, 2022, 9p.

Park, Daniel K. et al., "Circuit-Based Quantum Random Access Memory for Classical Data", Jan. 8, 2019, pp. 1-4, Internet: <URL: arxiv.org/pdf/1901.02362v1.pdf>.

Joachims, Thorsten, "Training Linear SVMs in Linear Time", Research Track Paper, Cornel University, Aug. 23, 2006, pp. 217-226, ACM Press, US.

International Search Report and Written Opinion for priority application PCT/CN2021/073645 dated Apr. 30, 2021, 9p, in Chinese language.

Concise Explanation of Relevance for International Search Report and Written Opinion for priority application PCT/CN2021/073645, 1p.

* cited by examiner

DATA CLASSIFICATION METHOD USING QUANTUM COMPUTER, QUANTUM COMPUTER SYSTEM, AND CLASSIFIER TRAINING METHOD OF QUANTUM COMPUTER SYSTEM

RELATED APPLICATION

This application is a continuation of PCT Application No. PCT/CN2021/073645, filed Jan. 25, 2021, which claims priority to Chinese Patent Application No. 202010446946.6, entitled "DATA CLASSIFICATION METHOD AND SYSTEM, AND CLASSIFIER TRAINING METHOD AND SYSTEM" and filed on May 25, 2020. The above applications are incorporated herein by reference in their entireties.

TECHNICAL FIELD

Embodiments of the disclosure relate to the field of artificial intelligence (AI), cloud technologies, and quantum technologies, and in particular, to a data classification method and system, and a classifier training method and system.

BACKGROUND

A support vector machine (SVM) is a supervised learning model configured to classify data, and has a wide variety of application scenarios in the technical field of artificial intelligence (AI).

During training, to improve the efficiency of processing a large data set, technicians train the SVM by using feature maps corresponding to shift-invariant kernels. The shift-invariant kernel means that a kernel function obtained by moving two pieces of training data by the same distance does not change. During actual application, to-be-classified data is inputted into the SVM, and the SVM outputs a classification result corresponding to the to-be-classified data.

However, because the use of the feature maps corresponding to the shift-invariant kernels in the SVM limits a feature space, the classification precision of the SVM is relatively low, resulting in an inaccurate final classification result.

SUMMARY

Embodiments of the disclosure provide a data classification method and system, and a classifier training method and system, to improve the accuracy of a final classification result. The technical solution is as follows:

According to an aspect, an embodiment of the disclosure provides a data classification method, including:

receiving, by a quantum computer, to-be-classified data, from a classical computer;

performing, by the quantum computer, feature mapping on the to-be-classified data by using a quantum circuit to obtain a quantum state of the to-be-classified data;

determining, by the quantum computer, an estimation result according to a boundary vector of a classifier, the quantum state of the to-be-classified data, and a quantum state of index information corresponding to the boundary vector; and transmitting the estimation result to the classical computer to determine a classification result corresponding to the to-be-classified data according to the estimation result, the quantum state of the index information referring to superposition of feature maps of training data used by the classifier during training.

According to another aspect, an embodiment of the disclosure provides a classifier training method, including:

obtaining, by a classical computer, a training data set, the training data set comprising m pieces of training data and standard labels corresponding to the m pieces of training data, m being a positive integer;

providing a working set, comprising at least two pieces of index information, the index information being used for indicating training data used in current training;

determining, by a quantum computer, an inner product of quantum states of every two pieces of index information in the working set to generate an inner product set, the quantum state of the index information referring to superposition of feature maps of the training data used in the current training; and generating, by the classical computer, an optimization problem of a classifier according to the inner product set to train the classifier according to the optimization problem of the classifier to obtain a boundary vector of the classifier.

According to another aspect, an embodiment of the disclosure provides a data classification system, including:

a classical computer configured to obtain to-be-classified data and determine a classification result corresponding to the to-be-classified data according to an estimation result; and a quantum computer, including a quantum circuit, the quantum computer being configured to:

receive the to-be-classified data from the classical computer;

perform feature mapping on the to-be-classified data by using the quantum circuit to obtain a quantum state of the to-be-classified data;

determine the estimation result according to a boundary vector of a classifier, the quantum state of the to-be-classified data, and a quantum state of index information corresponding to the boundary vector; and transmit the estimation result to the classical computer, the quantum state of the index information referring to superposition of feature maps of training data used by the classifier during training.

According to still another aspect, an embodiment of the disclosure provides a classifier training system, including a classical computer and a quantum computer, the classical computer being configured to obtain a training data set, the training data set including m pieces of training data and standard labels corresponding to the training data, m being a positive integer;

the quantum computer being configured to determine an inner product of quantum states of every two pieces of index information in a working set, and generate an inner product set, the working set including at least two pieces of index information, the index information being used for indicating training data used in current training, the quantum state of the index information referring to superposition of feature maps of the training data used in the current training; and the classical computer being further configured to generate an optimization problem of a classifier according to the inner product set, and train the classifier according to the optimization problem of the classifier to obtain a boundary vector of the classifier.

The technical solution provided in the embodiments of the disclosure may bring the following beneficial effects:

The quantum computer determines an estimation result according to a boundary vector of a classifier, a quantum state of to-be-classified data, and a quantum state of index information corresponding to the boundary vector, so that the classical computer determines a classification result corresponding to the to-be-classified data according to the estimation result. The quantum state of the index information corresponding to the boundary vector refers to the superposition of the feature maps of the training data used by the classifier during training. Because the classifier in the disclosure is not limited to using feature maps corresponding to shift-invariant kernels, and there is no limitation on the feature space, the classifier in the disclosure can find a better feature space to classify the to-be-classified data. That is, the boundary vector obtained in the disclosure is more accurate, and the classification precision of the classifier is higher, so that the final classification result is more accurate.

BRIEF DESCRIPTION OF THE DRAWINGS

To describe the technical solution in the embodiments of the disclosure more clearly, the following briefly introduces the accompanying drawings required for describing the embodiments. Apparently, the accompanying drawings in the following description show only some embodiments of the disclosure, and a person of ordinary skill in the art may still derive other accompanying drawings from these accompanying drawings without creative efforts.

DESCRIPTION OF EMBODIMENTS

To make objectives, technical solutions, and advantages of the disclosure clearer, the following further describes implementations of the disclosure in detail with reference to the accompanying drawings.

Before embodiments of the disclosure are described, some terms involved in the disclosure are explained first.

1. A quantum computer is a device that performs computation by manipulating a state of a quantum system. It is assumed that the quantum computer is fault tolerant, that is, the quantum computer can perform computation of an arbitrary length to achieve user-specified precision. The quantum computer is a type of physical apparatus that performs high-speed mathematical and logical operations, and stores and processes quantum information efficiently by following the laws of quantum mechanics. An apparatus processing and computing quantum information and running a quantum algorithm is the quantum computer.

2. A classical computer is an ordinary non-quantum computer.

3. A support vector machine (SVM) is a supervised learning model configured to classify data, and has broad application scenarios such as image, pattern and handwriting recognition, emotion analysis, face and object detection, voice verification, and bioinformatics.

4. A quantum circuit refers to a series of operations performed by a quantum computer to convert one inputted quantum state into another quantum state for output. The quantum circuit is a circuit acting on quantum bits, and the quantum bits may be implemented as a quantum chip.

5. In mathematics, an inner product refers to mapping from two vectors to a scalar, and measures an overlapping part between one vector and another vector. An inner product of a vector x and a vector y is represented by <x, y>.

6. A feature map is obtained by performing a mathematical operation for mapping one vector space to another vector space (generally a higher dimensional space). The feature map is commonly used in machine learning (ML).

7. A quantum random access memory (QRAM) is a device configured to store data vectors, so that a quantum computer can efficiently read and encode a probability amplitude of a quantum state. For example, if a data vector $z \in R^n$ is stored in the QRAM, a quantum state $\Sigma_i z_i |i\rangle$ proportional to a quantum state of a log(n) quantum bit can be efficiently prepared. A main objective of the QRAM is to store proper data in a specific manner, so that the quantum computer can effectively create a quantum state required for inner product estimation.

8. A classifier divides a feature space into two parts of surfaces.

9. A quantum state ρ is used for representing all information of a quantum system. ρ is a d×d complex matrix, where d is a quantity of dimensions of the quantum system.

Figure 1:
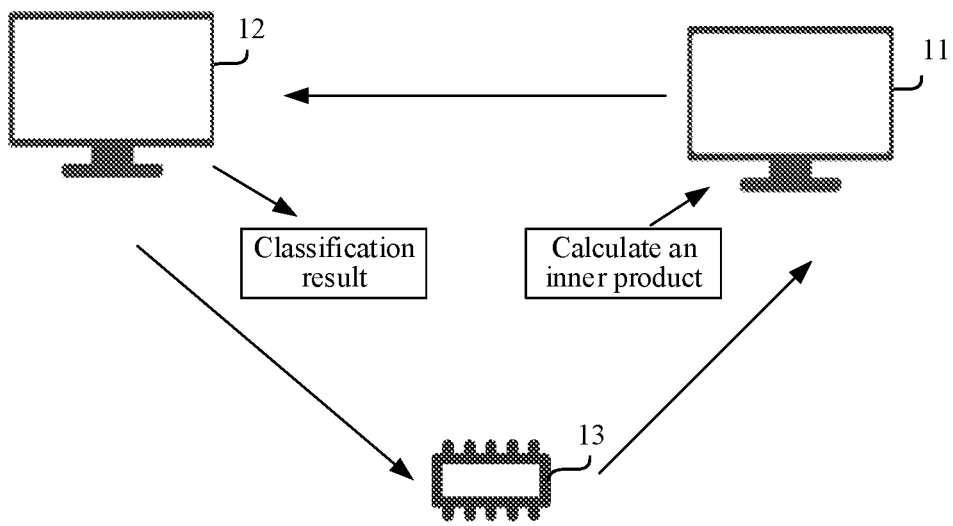
FIG. 1 is a schematic diagram of an implementation environment according to an embodiment of the disclosure.

FIG. 1 is a schematic diagram of an implementation environment according to an embodiment of the disclosure. The implementation environment includes: a quantum computer 11, a classical computer 12, and a QRAM 13.

The classical computer 12 is configured to obtain to-be-classified data, and transmit the to-be-classified data to the QRAM 13. The QRAM 13 stores a boundary vector of a classifier, m (m being a positive integer) pieces of training data, and a target parameter corresponding to index information corresponding to the boundary vector. The quantum computer 11 obtains, from the QRAM 13, the to-be-classified data, the boundary vector of the classifier, training data corresponding to the index information corresponding to the boundary vector, and the target parameter corresponding to the index information corresponding to the boundary vector, obtains an estimation result according to the foregoing four pieces of information, and transmits the estimation result to the classical computer 12. The classical computer 12 is configured to obtain a classification result corresponding to the to-be-classified data according to the estimation result.

In an example, the QRAM 13 is disposed inside the quantum computer 11, and is a component of the quantum computer 11. In another example, the QRAM 13 is disposed outside the quantum computer 11 and is not a component of the quantum computer 11.

The quantum computer 11 may serve as optional special hardware under cloud computing. A quantum classification algorithm provided in this embodiment of the disclosure may be an artificial intelligence (AI) service on the quantum computer. The solution provided in this embodiment of the disclosure relates to application of a machine learning technology of AI in the field of cloud technologies.

The cloud technology is a collective name of a network technology, an information technology, an integration technology, a management platform technology, an application technology, and the like that are applied based on a cloud computing business mode, and the cloud technology may form a resource pool, which is used based on requirements and is flexible and convenient. A cloud computing technology becomes an important support. A backend service of a technical network system requires a large amount of computing and storage resources, such as a video website, an image website, and more portal websites. With the intensive development and application of the Internet industry, each article may have a unique identifier in the future and needs to be transmitted to a backend system for logical processing. Data at different levels is separately processed, and data in various industries all requires strong system support, which can be implemented through cloud computing.

Cloud computing refers to the delivery and use mode of Internet technology (IT) infrastructure, and means obtaining required resources through a network in an on-demand and scalable manner. Generalized cloud computing refers to the delivery and use mode of services, and means obtaining required services through a network in an on-demand and scalable manner. The services may be related to IT and software, or the Internet, or may be other services. The cloud computing is a product of integration of traditional computer and network technologies such as grid computing, distributed computing, parallel computing, utility computing, network storage technologies, virtualization, and load balance.

With the diversified development of Internet, real-time data streams, and connection devices, as well as the emerging requirements such as a search services, social networks, mobile commerce, and open collaboration, the cloud computing is developed rapidly. Unlike conventional parallel distributed computing, the cloud computing theoretically promotes revolutionary changes to the whole Internet mode and the enterprise management mode. The cloud computing may be performed on a cloud server, and the cloud server may provide basic cloud computing services such as a cloud service, cloud computing, and an AI platform.

The AI cloud service is also generally referred to as AI as a service (AIaaS). This is currently a mainstream service mode of the AI platform. Specifically, an AIaaS platform splits several types of common AI services and provides independent or packaged services on cloud. Such a service mode is similar to opening an AI theme mall, in which all developers can access, through API interfaces, one or more AI services provided by the platform; some senior developers can also deploy and operate their own cloud AI services by using an AI framework and AI infrastructure provided by the platform.

Next, the disclosure is described by using several embodiments.

Figure 2:
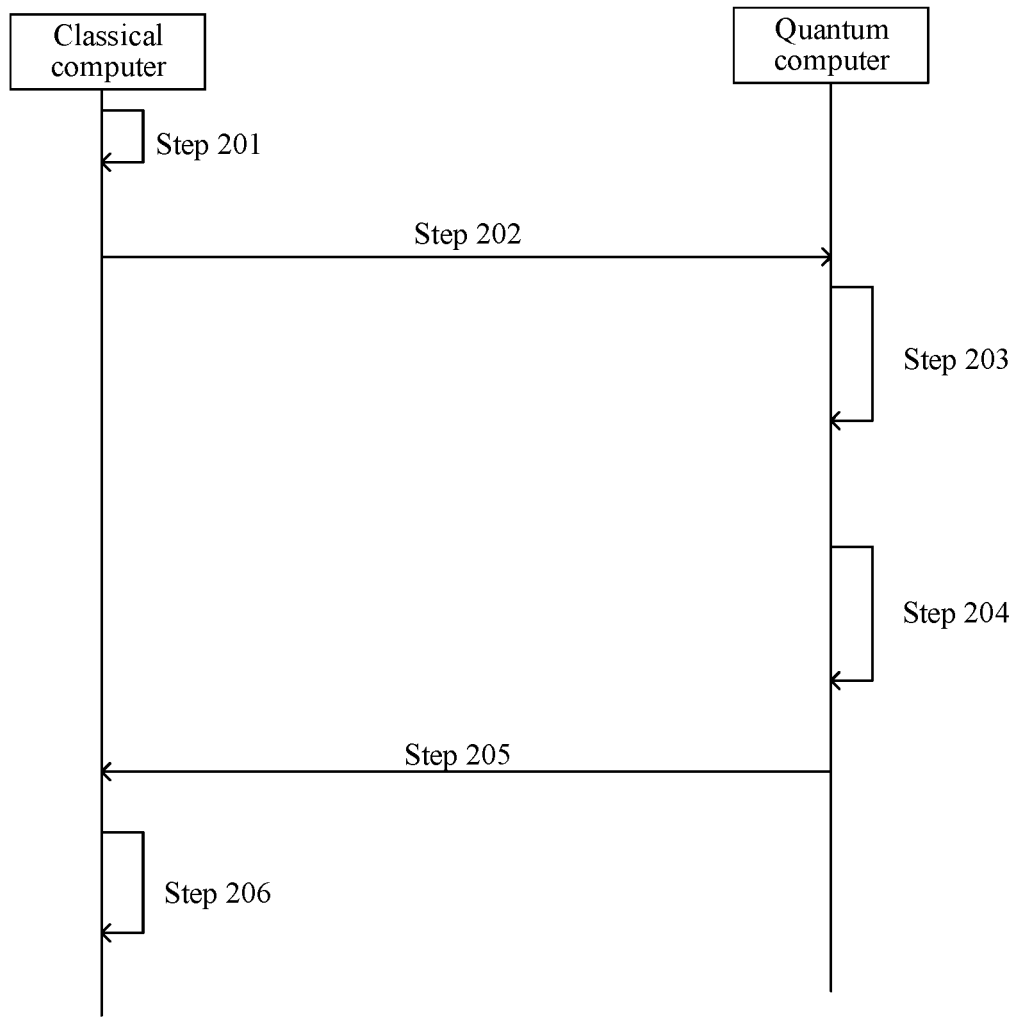
FIG. 2 is a flowchart of a data classification method according to an embodiment of the disclosure.

FIG. 2 is a flowchart of a data classification method according to an embodiment of the disclosure. The method may include the following steps:

Step 201. A classical computer obtains to-be-classified data.

The to-be-classified data may be any data. In this embodiment of the disclosure, the to-be-classified data is data that needs to be classified, and the to-be-classified data is data without a label. Exemplarily, the to-be-classified data may include a character, a medical diagnostic image, text information, molecular information, material information, or the like. The character refers to a letter or a number; the medical diagnosis image refers to an image of a patient for diagnosing whether the patient has a disease; the text information refers to information in a form of text; the molecular information refers to information used for describing molecules; the material information refers to information used for describing a material.

In an exemplary implementation, the classical computer locally obtains the to-be-classified data.

In an exemplary implementation, an electronic device transmits to-be-classified data to the classical computer, and the classical computer receives the to-be-classified data from the electronic device. Exemplarily, the electronic device may be a mobile phone, a tablet computer, a smart wearable device, an electron microscope, or the like.

Step 202. The classical computer provides the to-be-classified data to a quantum computer.

In an exemplary implementation, the classical computer transmits to-be-classified data to a QRAM, and the quantum computer obtains the to-be-classified data from the QRAM.

In an exemplary implementation, the classical computer and the quantum computer may communicate with each other through a network. The network may be a wired network or a wireless network. This is not limited in this embodiment of the disclosure. The classical computer provides the to-be-classified data to the quantum computer through the network.

Step 203. The quantum computer performs feature mapping on the to-be-classified data by using a quantum circuit to obtain a quantum state of the to-be-classified data.

The quantum circuit may be user-defined, and the quantum circuit is configured to map the to-be-classified data to the corresponding quantum state.

In an exemplary embodiment, the foregoing step 203 may be replaced with the following step: determining, by the quantum computer, the quantum state of the to-be-classified data according to a sum of products of each feature value in a feature map of the to-be-classified data and a quantum state corresponding to the each feature value by using the quantum circuit.

In an exemplary implementation, the quantum state of the to-be-classified data is obtained through calculation by using the following formula:

$$|\phi(x)\rangle = \frac{1}{\||\tilde{\phi}(x)\rangle\|} \sum_{j=1}^{n} \phi(x)_j |j\rangle$$

$$|\tilde{\phi}(x)\rangle = \sum_{j=1}^{n} \phi(x)_j |j\rangle_j$$

where $\phi(x)$ represents a feature map of the to-be-classified data, $\phi(x)_j$ represents a $j^{th}$ feature value in the feature map of the to-be-classified data, $|j\rangle$ represents a quantum state corresponding to the $j^{th}$ feature value (also referred to as a quantum state of j), $|\phi(x)\rangle$ represents the quantum state of the to-be-classified data, $|\tilde{\phi}(x)\rangle$ represents the sum of the products of the each feature value in the feature map of the to-be-classified data and the quantum state corresponding to the each feature value, and $\||\tilde{\phi}(x)\rangle\|$ represents a modulus of $|\tilde{\phi}(x)\rangle$. $\phi(x) \in R^n$ is a substantive data vector. The feature map of the to-be-classified data includes n feature values, j being a positive integer less than or equal to n.

Step 204. The quantum computer determines an estimation result according to a boundary vector of a classifier, the quantum state of the to-be-classified data, and a quantum state of index information corresponding to the boundary vector.

The classifier, also referred to as a classification model, is a tool configured to classify data. Exemplarily, the classifier in this embodiment of the disclosure is a classifier for a binary classification task, for example, the SVM. Optionally, the classifier in this embodiment of the disclosure may be alternatively a classifier for a multi-category classification task. In this case, the classifier for the multi-category classification task may perform a plurality of times of binary classification on the to-be-classified data to obtain a final classification result.

Figure 3:
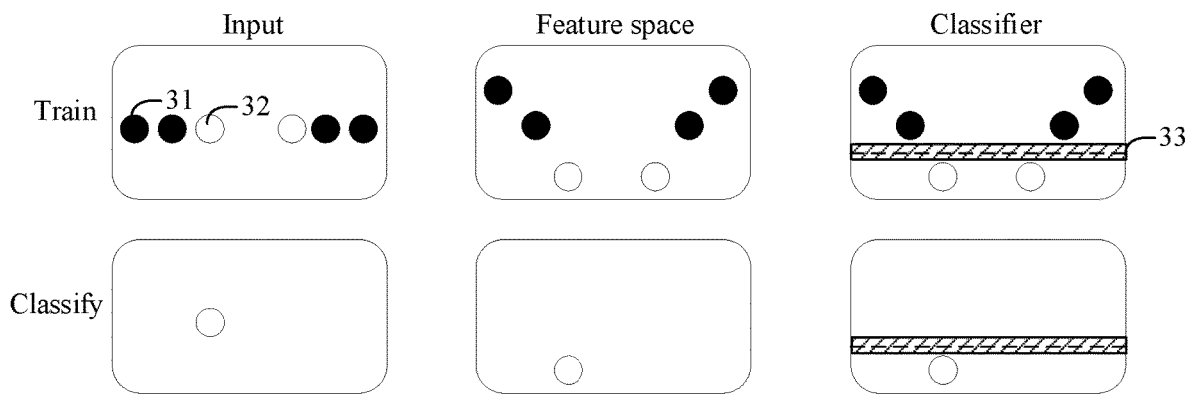
FIG. 3 is a schematic diagram of a classifier according to an embodiment of the disclosure.

The boundary vector of the classifier is used for distinguishing a first category from a second category (in which the first category and the second category are two different categories). As shown in FIG. 3, during training, the classifier obtains data of the first category and data of the second category (for example, in FIG. 3, black circles 31 represent data of the first category and white circles 32 represent data of the second category), maps the data of the first category and the data of the second category to a higher-dimensional feature space, and calculates a boundary vector (for example, in FIG. 3, a horizontal stripe 33 represents a boundary vector), so that the data of the first category and the data of the second category are located on two sides of the boundary vector respectively. During classification, the to-be-classified data is mapped to the feature space, and a classification result is determined according to a side of the classifier on which the to-be-classified data is located. Different classifiers may have different boundary vectors, and may also have different classification precisions. In an exemplary implementation, after finishing training on the classifier, the classical computer transmits an obtained boundary vector to the QRAM, and the quantum computer obtains the boundary vector from the QRAM.

In this embodiment of the disclosure, the quantum state of the index information corresponding to the boundary vector refers to superposition of feature maps of training data used by the classifier during training. The index information is used for indicating the training data used during training, and the index information corresponding to the boundary vector is used for indicating training data used when the classifier finally obtains the boundary vector during training. Exemplarily, if the boundary vector of the classifier is a vector obtained by the classical computer during final training, the quantum state of the index information corresponding to the boundary vector refers to superposition of feature maps of training data used by the quantum computer during final training. The QRAM stores the training data and the target parameter corresponding to the index information corresponding to the boundary vector. The target parameter corresponding to the index information corresponding to the boundary vector is generated based on the index information corresponding to the boundary vector, an amount m of training data, and a preset constant. For description of determining the target parameter, please refer to the following embodiments, and details are not described herein. The quantum computer subsequently obtains the foregoing data from the QRAM, and quickly obtains the quantum state of the index information corresponding to the boundary vector according to the foregoing data.

The estimation result may be used for determining the classification result of the to-be-classified data. The quantum computer first determines a product between the quantum state of the index information corresponding to the boundary vector and the boundary vector, and then determines an inner product between the product and the quantum state of the to-be-classified data, to obtain an estimation result.

Step 205. The quantum computer transmits the estimation result to the classical computer.

In an exemplary implementation, the quantum computer transmits the estimation result to the classical computer through a network. The network may be a wired network or a wireless network. This is not limited in this embodiment of the disclosure.

Step 206. The classical computer determines a classification result corresponding to the to-be-classified data according to the estimation result.

In an example, the classical computer determines, in response to the estimation result being a positive value, that the to-be-classified data pertains to a first category; on the other hand, the classical computer determines, in response to the estimation result being a negative value, that the to-be-classified data pertains to a second category. The first category and the second category are two different categories.

Exemplarily, the classification result corresponds to a label, the first category corresponds to a first label, and the second category corresponds to a second label. After determining the classification result corresponding to the to-be-classified data, the classical computer may annotate the to-be-classified data with a corresponding label. For example, if determining that the to-be-classified data pertains to the first category, the classical computer annotates the to-be-classified data with the first label. In another example, if determining that the to-be-classified data pertains to the second category, the classical computer annotates the to-be-classified data with the second label. Exemplarily, the first label is represented by +1, and the second label is represented by −1. Certainly, in another possible implementation, the first label and the second label may be further represented in other forms. This is not limited in this embodiment of the disclosure.

Briefly speaking, in the technical solution provided in this embodiment of the disclosure, the quantum computer determines an estimation result according to a boundary vector of a classifier, a quantum state of to-be-classified data, and a quantum state of index information corresponding to the boundary vector, so that the classical computer determines a classification result corresponding to the to-be-classified data according to the estimation result. The quantum state of the index information corresponding to the boundary vector refers to the superposition of the feature maps of the training data used by the classifier during training. Because the classifier in the disclosure is not limited to using feature maps corresponding to shift-invariant kernels, and there is no limitation on the feature space, the classifier in the disclosure can find a better feature space to classify the to-be-classified data. That is, the boundary vector obtained in the disclosure is more accurate, and the classification precision of the classifier is higher, so that the final classification result is more accurate.

In addition, in this embodiment of the disclosure, the estimation result is determined by the quantum computer, and the quantum computer has a relatively high processing speed, thereby ensuring the classification efficiency.

Figure 4:
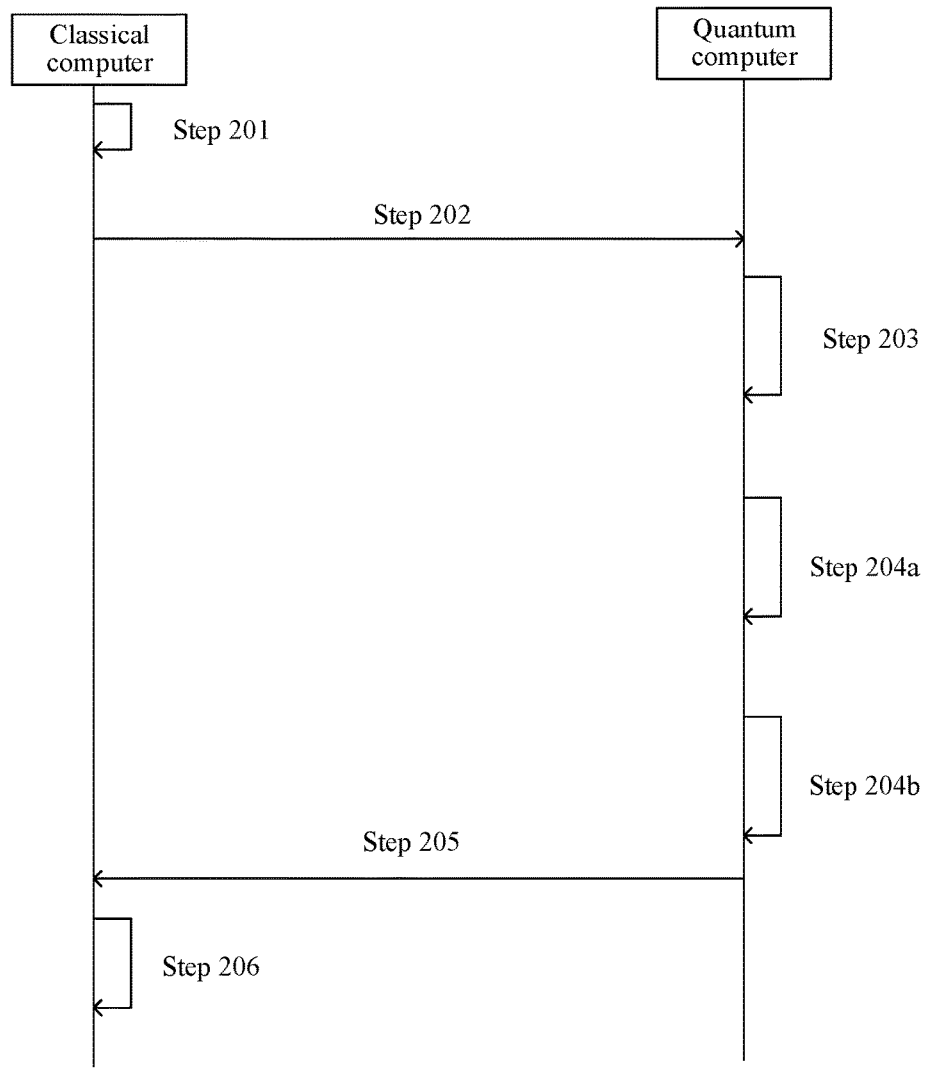
FIG. 4 is a flowchart of a data classification method according to another embodiment of the disclosure.

In an exemplary embodiment, as shown in FIG. 4, the foregoing step 204 may be replaced with the following steps:

Step 204a. The quantum computer determines a sum of products of each first vector element in the boundary vector and a quantum state of index information corresponding to the each first vector element as a first quantum state.

The first vector element is any element in the boundary vector, or may alternatively be referred to as any vector value in the boundary vector.

Step 204b. The quantum computer determines an inner product between the first quantum state and the quantum state of the to-be-classified data to obtain an estimation result.

In an exemplary implementation, the boundary vector is a vector obtained by the classical computer during final training, the first vector element is related to index information included in a working set used during final training, and the working set used during final training includes the index information corresponding to the first vector element. The index information may be represented by c, and the index information is a binary vector of m dimensions (m being a quantity of pieces of training data).

In an exemplary implementation, the estimation result is obtained through calculation by using the following formula:

$$\sum_c \alpha_c \langle \psi_c, \phi(x) \rangle$$

where $\alpha_c$ refers to a $c^{th}$ vector element in a boundary vector (the $c^{th}$ vector element is a vector element at a position corresponding to a decimal number value of c, that is, the first vector element), $\psi_c$ refers to a quantum state of index information corresponding to the first vector element, and $\phi(x)$ refers to the quantum state of the to-be-classified data. The first quantum state is represented by $$\sum_c \alpha_c \psi_c.$$

For ease of understanding, subscripts of vector elements in a boundary vector in the following are represented by decimal numbers, but it is to be understood that the decimal numbers correspond to the index information.

Optionally, $|\omega_c\rangle$ is defined below by using the following formula $$|\psi_c\rangle = \sum_{i=1}^{m} \beta_c(i) |\phi(x_i)\rangle,$$

where $\beta_c(i)$ is an m-dimensional vector, which may also be referred to as a probability amplitude. In this embodiment of the disclosure, feature mapping is implemented by using the quantum circuit. That is, for each input vector, the quantum computer encodes, by using the quantum circuit, the vector into a probability amplitude of a quantum state (or a higher-dimensional quantum state, which specifically depends on physical implementation of the quantum computer) formed by one or more quantum bits. For detailed description of obtaining the quantum state of the index information, refer to the following embodiments.

$\psi_c$ and $\phi(x)$ in the foregoing formula are merely for making the inner product expression more intuitive and concise, but essentially mean the quantum states, and are actually expressed as $|\psi_c\rangle$ and $|\phi(x)\rangle$. Therefore, in this embodiment of the disclosure, if there is no special case, all parameters in the inner product formula are generally quantum states.

Exemplarily, it is assumed that a training data set includes two pieces of training data, that is, m is 2; a working set used in final training includes the following index information: 01, 10, and 11. The first vector element in a boundary vector is represented by $\alpha_1(\alpha_{01})$, index information corresponding to $\alpha_1$ is 01, and a quantum state of 01 is represented by $|\psi_{01}\rangle$; the second vector element in the boundary vector is represented by $\alpha_2(\alpha_{10})$, index information corresponding to $\alpha_2$ is 10, and a quantum state of 10 is represented by $|\psi_{10}\rangle$; if the third vector element in the boundary vector is represented by $\alpha_3(\alpha_{11})$, index information corresponding to $\alpha_3$ is 11, and a quantum state of 11 is represented by $|\psi_{11}\rangle$, an estimation result is $\alpha_1 \langle \psi_{01}, \phi(x) \rangle + \alpha_2 \langle \psi_{10}, \phi(x) \rangle + \alpha_3 \langle \psi_{11}, \phi(x) \rangle$.

Figure 5:
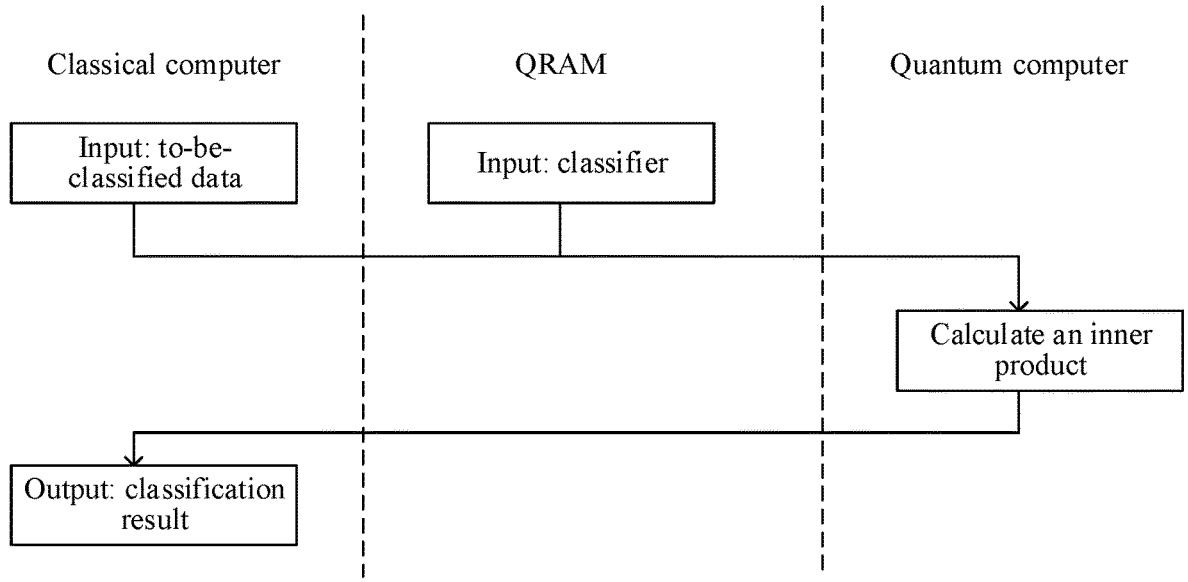
FIG. 5 is a schematic diagram of a data classification method according to another embodiment of the disclosure.

In an exemplary implementation, the quantum computer includes a QRAM, and the QRAM stores the boundary vector of the classifier, m pieces of training data, and the target parameter corresponding to the index information corresponding to the boundary vector. FIG. 5 is a schematic diagram of a data classification method according to another embodiment of the disclosure. The classical computer obtains to-be-classified data, and transmits the to-be-classified data to the QRAM. The quantum computer performs feature mapping on the to-be-classified data by using a quantum circuit to obtain a quantum state of the to-be-classified data. The quantum computer determines, according to training data corresponding to index information corresponding to the boundary vector and a target parameter that are stored in the QRAM, a quantum state of the index information corresponding to the boundary vector. The quantum computer further determines an estimation result according to a boundary vector of the classifier, the quantum state of the to-be-classified data, and the quantum state of the index information corresponding to the boundary vector that are stored in the QRAM. The quantum computer transmits the estimation result to the classical computer. The classical computer determines a classification result corresponding to the to-be-classified data according to the estimation result.

The disclosure is applicable to any classification scenario. For example, the disclosure is applicable to a character recognition scenario, a medical image scenario, an emotion analysis scenario, molecular and material property testing scenarios, or the like. The specific application scenario is not limited in this embodiment of the disclosure.

In an example, the to-be-classified data includes a character, and the classification result includes a character recognition result corresponding to the character.

The character refers to a letter or a number. Exemplarily, the character refers to a handwriting letter or a handwriting number. The character recognition result is used for indicating whether the character matches a preset standard. For example, the character recognition result is used for indicating whether the letter is a vowel. In another example, the character recognition result is used for indicating whether the number is greater than 5. The embodiments of the disclosure may be applied to classify handwriting samples, and give a character recognition result.

In another example, the to-be-classified data includes a medical diagnosis image, and the classification result includes an image recognition result corresponding to the medical diagnosis image.

The medical diagnosis image is an image of a patient for diagnosing whether the patient has a disease. For example, the medical diagnosis image may be an X-ray image or a magnetic resonance imaging (MRI) image, and the image recognition result is used for indicating whether the patient has a disease. The embodiments of the disclosure can improve the accuracy of medical diagnosis and provide a proper treatment solution.

In an example, the to-be-classified data includes text information in a social application, and the classification result includes an emotion recognition result corresponding to the text information.

The text information in the social application includes a tweet, a social media post, and the like. The emotion recognition result is used for indicating whether the text information expresses positive emotion or negative emotion.

In another example, the to-be-classified data includes molecular information, and the classification result includes a property recognition result corresponding to the molecular information.

The molecular information is used for describing the molecule, and the property recognition result is used for indicating whether the molecule has a preset property. This has an important application in bioinformatics, biochemistry, and drug design.

In another example, the to-be-classified data includes material information, and the classification result includes a property recognition result corresponding to the material information.

The material information is used for describing the material, and the property recognition result is used for indicating whether the material has a preset property. For example, the material may be a magnetic material. In this case, the property recognition result is used for indicating whether the material has magnetism or whether magnetism is higher than a threshold level. For predicting a magnetic property of the material, the material information is first modeled as a crystal lattice composed of quantum spins, and a property recognition result corresponding to the material information is determined. The disclosure can be used for predicting the magnetic property of the material, which has an important application in advanced material design. A specific classification problem example in which the disclosure outperforms the related art is provided below. Considering that a physical system is a generalized Ising chain composed based on N quantum spins, the physical system is described by using the following Hamiltonian $H_N$:

$$H_N = -\sum_{j=1}^{N} J_j Z_j \otimes Z_{j+1} + \sum_{j=1}^{N} \Delta_j X_j + \Gamma_j Z_j,$$

where $Z_j$ and $X_j$ are Pauli operators acting on a $j^{th}$ quantum spin in the chain, and $J_j$, $\Delta_j$, and $\Gamma_j$ are real-number parameters. Each to-be-classified data in this classification problem is a parameter required for defining a generalized Ising chain: $(J_j, \Delta_j, \Gamma_j)$. In addition, the classification result or the label is determined according to whether an average magnetic square $$M = \frac{1}{N}\left(\sum_j Z_j\right)^2$$

is greater than or less than a specific critical value $\mu_0$. The task of classification is to give a piece of to-be-classified data $(J_j, \Delta_j, \Gamma_j)$, and then predict whether the Ising chain has magnetism.

Such a problem not only has great significance from the perspective of fundamental physics, but also has potential significance for design and analysis of materials with some required characteristics.

Figure 6:
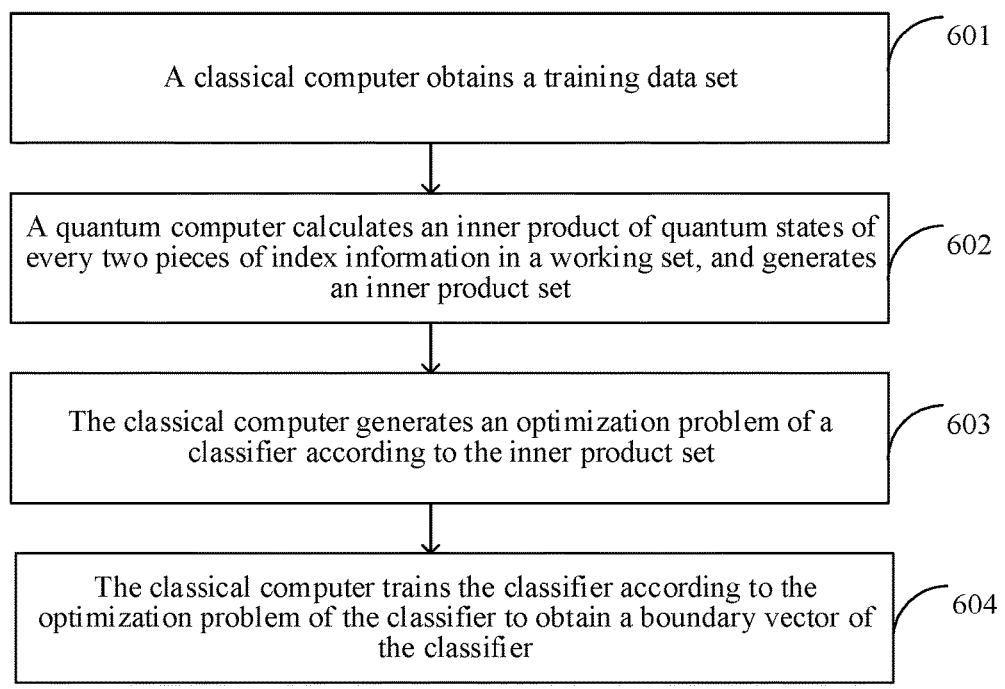
FIG. 6 is a flowchart of a classifier training method according to an embodiment of the disclosure.

FIG. 6 is a flowchart of a classifier training method according to an embodiment of the disclosure. The method may include the following steps:

Step 601. A classical computer obtains a training data set.

In this embodiment of the disclosure, the training data set includes m pieces of training data and standard labels corresponding to the training data, m being a positive integer. Exemplarily, the standard label is used for indicating a standard classification result. Exemplarily, the standard label is represented by +1 or −1. When the standard label is +1, it indicates that the training data pertains to the first category. When the standard label is −1, it indicates that the training data pertains to a second category. In an exemplary implementation, the standard label is manually annotated.

Step 602. A quantum computer determines an inner product of quantum states of every two pieces of index information in a working set, and generates an inner product set.

In this embodiment of the disclosure, the working set includes at least two pieces of index information, the index information is used for indicating training data used in current training, and the quantum state of the index information refers to superposition of feature maps of the training data used in the current training. Exemplarity, the index information is a binary vector of a length m. The index information may be represented by c, the quantum state of the index information may be represented by $|\psi_c\rangle$, and the inner product of the quantum states of the two pieces of index information may be represented by $\langle \psi_c, \psi_{c'} \rangle$, where c and c' may be two different index information or two same index information. The working set may be represented by W.

In this embodiment of the disclosure, the main function of the quantum computer is to predict an inner product in a form of $\langle \psi_c, \psi_{c'} \rangle$.

In an exemplary implementation, m is consistent with the quantity of pieces of training data, an element in an $i^{th}$ dimension in the binary vector of the length m is used for indicating whether $i^{th}$ piece of training data is used in the current training, i being a positive integer less than or equal to m. In an exemplary implementation, the classical computer sorts and labels each piece of training data in the training data set. For example, assuming that the training data set includes three pieces of training data, the classical computer sorts and labels the three pieces of training data as follows: training data 1, training data 2, and training data 3.

Assuming that the training data set includes three pieces of training data, including training data 1, training data 2, and training data 3, and that the working set includes the following index information: 001, 011, and 110, 001 is used for indicating the training data 3 used in the current training, and a quantum state $|\psi_{001}\rangle$ refers to a feature map of the training data 3; 011 is used for indicating the training data 2 and the training data 3 used in the current training, and a quantum state $|\psi_{011}\rangle$ of 011 refers to superposition of feature maps of the training data 2 and the training data 3; 110 is used for indicating the training data 1 and the training data 2 used in the current training, and a quantum state $|\psi_{110}\rangle$ of 110 refers to superposition of feature maps of the training data 1 and the training data 2.

Exemplarily, the quantum computer calculates the inner product of the quantum states of every two pieces of index information in the working set, and generates the inner product set. Still using the foregoing example, the quantum computer calculates $\langle\psi_{001}, \psi_{011}\rangle$, $\langle\psi_{001}, \psi_{110}\rangle$, and $\langle\psi_{011}, \psi_{110}\rangle$ to obtain three inner products, and generates an inner product set.

After generating the inner product set, the quantum computer transmits the inner product set to the classical computer. In an exemplary implementation, when the quantum computer generates an inner product, the quantum computer transmits the inner product to the classical computer.

Step 603. The classical computer generates an optimization problem of a classifier according to the inner product set.

In an exemplary embodiment, the classical computer generates the optimization problem of the classifier in the following manner: generating, by the classical computer, a matrix according to the inner product set; mapping the matrix to a positive semidefinite cone to obtain a positive semidefinite matrix; and generating the optimization problem of the classifier according to the positive semidefinite matrix and the amount m of training data.

Exemplarily, a matrix element in the matrix is determined according to the inner product of the quantum states of the two pieces of index information. The foregoing example is still used for description. The classical computer may determine a matrix element in the first row and third column in the matrix according to $\langle\psi_{001}, \psi_{011}\rangle$. Exemplarily, the classical computer performs estimation value processing on each inner product in the inner product set to obtain an estimation value corresponding to each inner product; the classical computer determines the estimation value corresponding to the each inner product as a matrix element of the matrix. That is, a matrix element $J_{cc'}=\text{Est}(\langle\psi_c, \psi_{c'}\rangle)$, where $J_{cc'}$ represents a matrix element in a $c^{th}$ row and a $(c')^{th}$ column (the $c^{th}$ row refers to a row number corresponding to a decimal number value of c, and the $(c')^{th}$ column refers to a column number corresponding to a decimal number value of c'), and Est( ) represents an estimation value. That is, after a plurality of operations are performed on $\langle\psi_c, \psi_{c'}\rangle$, an average value is obtained. Exemplarily, the classical computer projects the matrix onto a nearest (same dimensional) positive semidefinite cone to obtain a positive semidefinite matrix.

Exemplarily, the optimization problem of the classifier is expressed by using the following formula:

$$\arg\max_{\alpha\geq 0} -\frac{1}{2}\sum_{c'\in W}\alpha_c\alpha_{c'}\tilde{J}_{cc'} + \sum_{c\in W}\frac{\|c\|_1}{m}\alpha_c$$

$$\text{s.t.}\sum_{c\in W}\alpha_c \leq C$$

where argmax( ) refers to finding a parameter with a maximum score, and the foregoing formula refers to finding a boundary vector within a range in which a sum of $\alpha_c$ is less than or equal to C, so that $$-\frac{1}{2}\sum_{c'\in W}\alpha_c\alpha_{c'}\tilde{J}_{cc'} + \sum_{c\in W}\frac{\|c\|_1}{m}\alpha_c$$

has a maximum value, $\alpha$ is a boundary vector, $\alpha_c$ is a $c^{th}$ vector element in the boundary vector, $\alpha_{c'}$ is a $(c')^{th}$ vector element in the boundary vector, $\tilde{J}_{cc'}$ is a matrix element in a $c^{th}$ row and a $(c')^{th}$ column in a positive semidefinite matrix, c refers to index information, C refers to a penalty factor, and $\|c\|_1$ is a modulus of c obtained through calculation by using the following formula:

$$\sum_{i=1}^{m}|c_i|.$$

Step 604. The classical computer trains the classifier according to the optimization problem of the classifier to obtain a boundary vector of the classifier.

The classical computer solves the optimization problem of the classifier to obtain an optimal answer, that is, to obtain the boundary vector of the classifier.

In the disclosure, the quantum computer is not limited to using feature maps corresponding to shift-invariant kernels to perform efficient data classification on a large data set, and a required training time is proportional to (only differs by a factor of one logarithmic polynomial from) a data amount. Because the quantum computer is not limited to using the feature maps corresponding to the shift-invariant kernels to more accurately classify the data, the embodiments of the disclosure allow efficient and accurate classification on a wider variety of data types.

In the disclosure, the data are classified by combining the index information with the quantum state of the data. Because the quantum state of the data corresponds to the data, and the quantum state of the data is a representation of various different feature maps, the embodiments of the disclosure are not limited to the feature maps corresponding to the shift-invariant kernels, and there is no limitation on the feature space. Therefore, a better feature space can be more easily found, so that a finally obtained result of the classifier is more optimized, and the classification result is more accurate. In addition, the computing amount can be reduced by classifying the index information, thereby ensuring the training efficiency.

Briefly speaking, in the technical solution provided in this embodiment of the disclosure, the classical computer obtains a training data set; the quantum computer calculates an inner product of quantum states of every two pieces of index information in a working set, and generates an inner product set; the classical computer generates an optimization problem of a classifier according to the inner product set, and trains the classifier according to the optimization problem to obtain a boundary vector of the classifier. The quantum state of the index information refers to the superposition of the feature maps of the training data used by the classifier during training. Because the use of feature maps corresponding to shift-invariant kernels is not limited in the classifier in the disclosure, and does not limit a feature space, the classifier in the disclosure can find a better feature space to classify the to-be-classified data. That is, the boundary vector obtained in the disclosure is more accurate, and the classification precision of the classifier is higher, so that the final classification result is more accurate.

In addition, in this embodiment of the disclosure, the quantum computer calculates the inner product, and the quantum computer has a relatively high processing speed, thereby ensuring the classification efficiency. The training time required by the classifier in this disclosure is proportional to (only differs by a factor of one logarithmic polynomial from) the amount m of training data. The classifier being an SVM is used as an example. For comparison between a training time of the SVM in this embodiment of this disclosure and a training time of the SVM in the related art, refer to Table 1.

TABLE 1

| SVM training method in this embodiment of this disclosure | $\tilde{O}(m)$ is proportional to (at most differs by a factor of one logarithmic polynomial from) m. |
| --- | --- |
| Classical SVM training method in the related art | $\Omega(m^3)$ is at least proportional to a cube of m. |
| Quantum SVM training algorithm in the related art | $\Omega(m^3)$ is at least proportional to a cube of m. |

The classical SVM training method in the related art is a method in which only a classical computer performs classification by using feature maps that do not need to correspond to shift-invariant kernels in a standard (non-simplified) SVM. The quantum SVM training method in the related art is a method in which a classical computer and a quantum computer perform classification by using feature maps that do not need to correspond to shift-invariant kernels in a standard (non-simplified) SVM. m is the quantity of pieces of training data used during training. $\tilde{O}(m)$ means that the training time (running time) is proportional to (at most differs by a factor of one logarithmic polynomial from) m. $\Omega(m^3)$ means that the training time is proportional to the cube of m, that is, time complexity is proportional to the cube of m. It can be seen from Table 1 that, when there is a relatively large amount of training data (data amount for short), the training time required in this embodiment of this disclosure is relatively short.

An example in which the classifier is an SVM, and a classification problem is the generalized Ising chain (N=6, $$J_j = \cos\frac{k_J\pi(j-1)}{N},$$

$$\Delta j = \Delta\sin\frac{k_\Delta\pi j}{N},$$

$\Gamma_j=\Gamma$, and J, $k_J$, $\Delta$, and $k_\Delta$ are all real numbers) described in the foregoing embodiments is used for description. The classical numerical simulation shows that, this disclosure can outperform the SVM training method in the related art in a wide range of data amount. As shown in Table 2, which shows a difference in classification precision between this disclosure and the related art under different data amounts. Therefore, it can be seen that the classification precision in this disclosure is greatly superior to the classification precision in the related art.

TABLE 2

| m (data amount) | $10^2$ | $10^3$ | $10^4$ |
| --- | --- | --- | --- |
| Classification precision % (this disclosure) | 93.3 | 99.3 | 99.0 |
| Classification precision (related art) | 86.7 | 96.0 | 99.0 |

Figure 7:
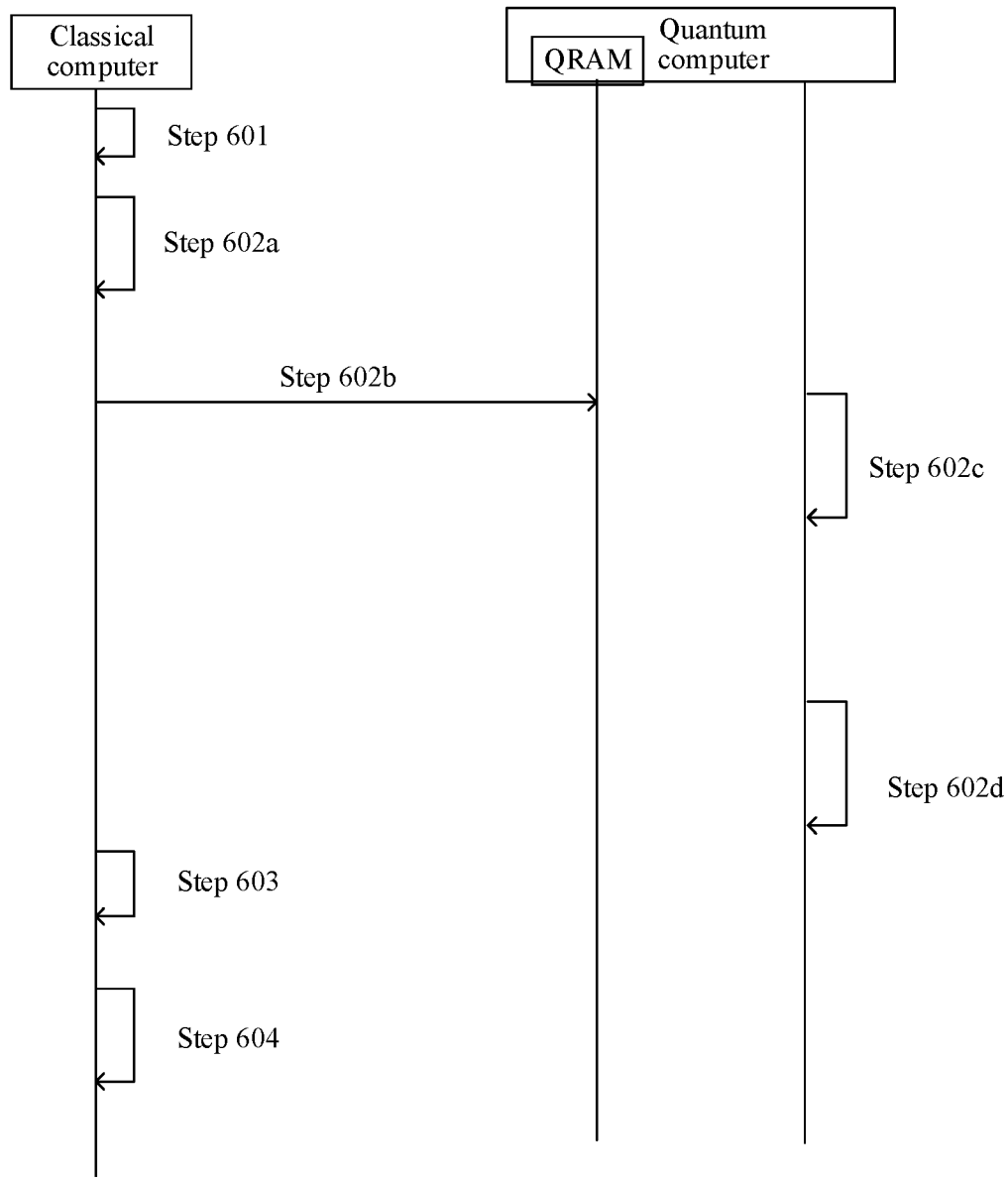
FIG. 7 is a flowchart of a classifier training method according to another embodiment of the disclosure.

In an exemplary embodiment, as shown in FIG. 7, the foregoing step 602 may be replaced with the following steps:

Step 602a: The classical computer selects first index information and second index information from the working set.

The first index information is any index information in the working set; the second index information is any index information in the working set, and the first index information is different from the second index information. The foregoing example is still used. Assuming that the working set includes the following index information: 001, 011, and 110, the first index information may be 011, and the second index information may be 110.

Step 602b. The classical computer transmits m pieces of training data to a QRAM.

The classical computer obtains a training data set, and the training data set includes the m pieces of training data. The classical computer transmits the m pieces of training data to the quantum computer.

In an exemplary implementation, if the quantum computer includes the QRAM, the classical computer transmits the m pieces of training data to the QRAM in the quantum computer.

The classical computer may first perform step 602b and then perform step 602a, or may first perform step 602a and then perform step 602b; alternatively, it may perform step 602a and step 602b simultaneously. An execution order of step 602a and step 602b is not limited in this embodiment of this disclosure.

Step 602c. The quantum computer determines, according to the first index information, first training data from the m pieces of training data stored in the QRAM, and determines, according to the second index information, second training data from the m pieces of training data stored in the QRAM.

In this embodiment of this disclosure, the first index information is used for indicating the first training data used in current training, and the second index information is used for indicating the second training data used in the current training. Still according to the foregoing example, when the first index information is 011, the first training data includes training data 2 and training data 3; when the second index information is 110, the second training data includes training data 1 and training data 2.

Step 602d. The quantum computer generates an inner product between a quantum state of the first index information and a quantum state of the second index information according to the first training data, the second training data, the first index information, and the second index information.

The quantum state of the first index information refers to superposition of feature maps of the first training data, and the quantum state of the second index information refers to superposition of feature maps of the second training data.

Exemplarily, step 602d includes the following substeps:

1. The quantum computer generates the quantum state of the first index information according to the first training data and the first index information.

Exemplarily, the step includes the following substeps:

1.1. The classical computer calculates a target parameter according to the first index information, a standard label corresponding to the first training data, an amount m of training data, and a preset constant.

In an exemplary implementation, the target parameter is represented by $$\frac{c_i y_i}{\sqrt{m}} A_i$$

where $c_i$ represents an $i^{th}$ element in the first index information, $y_i$ represents a standard label corresponding to an $i^{th}$ piece of training data, and $A_i$ is a preset constant. Exemplarily, $A_i$ is a user-defined non-negative value, and the purpose is to ensure the stability of calculation. ($A_i$)s corresponding to different i may be the same or different.

1.2. The classical computer transmits the target parameter to the QRAM.

In an exemplary implementation, the classical computer transmits both the m pieces of training data in the training data set and target parameters corresponding to all the index information in the working set to the QRAM.

1.3. The quantum computer performs feature mapping on the first training data by using a quantum circuit to obtain a quantum state of the first training data.

In an exemplary implementation, when the first training data includes a plurality of pieces of training data, the quantum computer respectively performs feature mapping on the plurality of pieces of training data by using the quantum circuit to obtain respective quantum states of the plurality of pieces of training data. Certainly, in an exemplary implementation, the quantum computer performs feature mapping on the plurality of pieces of training data in parallel by using the quantum circuit to obtain respective quantum states of the plurality of pieces of training data. The manner of generating the quantum state of the training data is similar to the manner of generating the quantum state of the to-be-classified data. For description of the manner of generating the quantum state of the training data, refer to the foregoing description of the manner of generating the quantum state of the to-be-classified data, and details are not described herein again.

1.4. Determine a quantum state of the first index information according to the quantum state of the first training data and the target parameter.

In an exemplary implementation, the quantum state of the first index information is determined by using the following formula:

$$|\psi_c\rangle = \frac{1}{\||\tilde{\psi}_c\rangle\|} \sum_i \frac{c_i y_i}{m} A_i |\phi(x_1)\rangle$$

$$|\tilde{\psi}_c\rangle = \sum_i \frac{c_i y_i}{m} A_i |\phi(x_1)\rangle$$

where $\phi(x_i)$ represents a feature map of the $i^{th}$ piece of training data, and $|\phi(x_i)\rangle$ represents a quantum state of the $i^{th}$ piece of training data.

Exemplarily, assuming that the training data set includes two pieces of training data: training data 1 and training data 2, m is 2. Assuming that the first index information is 11, the first training data includes the training data 1 and the training data 2, the target parameter includes $$\frac{1*y_1}{\sqrt{2}} A_1 \text{ and } \frac{1*y_2}{\sqrt{2}} A_2,$$

and $|\psi_{11}\rangle$ may be determined through $$|\tilde{\psi}_{11}\rangle = \frac{1*y_1}{2} A_1 |\phi(x_1)\rangle + \frac{1*y_2}{\sqrt{2}} A_2 |\phi(x_2)\rangle.$$

2. The quantum computer generates the quantum state of the second index information according to the second training data and the second index information.

The manner of generating the quantum state of the second index information is similar to the manner of generating the quantum state of the first index information. For description of the manner of generating the quantum state of the second index information, refer to the foregoing description of the manner of generating the quantum state of the first index information, and details are not described herein again.

3. The quantum computer generates the inner product between the quantum state of the first index information and the quantum state of the second index information.

The manner of calculating the inner product of the quantum states of every two pieces of index information in the working set is consistent with the manner of calculating the inner product between the quantum state of the first index information and the quantum state of the second index information.

In an exemplary embodiment, the classifier updates the working set during each training, so that training data used in each training is different. The training method of the foregoing classifier further includes the following steps:

1. In $t^{th}$ training of the classifier, the classical computer determines an initial boundary vector of the classifier, t being a positive integer.

In this embodiment of this disclosure, the initial boundary vector is an initial answer to the optimization problem of the classifier, and is a boundary vector of the classifier that does not finish training. During each training, the classical computer obtains an initial boundary vector corresponding to the current training. For example, in the $t^{th}$ training, the classical computer obtains the initial boundary vector corresponding to the $t^{th}$ training.

2. The classical computer provides the initial boundary vector to the quantum computer.

Exemplarily, the classical computer stores the initial boundary vector in the QRAM. The quantum computer obtains the initial boundary vector from the QRAM.

3. The quantum computer determines a prediction estimation result of each round of cycle in the $t^{th}$ training according to a quantum state of training data of the each round of cycle in the $t^{th}$ training, the initial boundary vector, and a quantum state of index information in a working set used in the $t^{th}$ training.

Exemplarily, the step includes the following sub-steps:

1. The quantum computer determines a sum of products of each second vector element in the initial boundary vector and a quantum state of index information corresponding to each of the second vector element in the working set used in the $t^{th}$ training as a second quantum state.

2. The quantum computer determines an inner product between the second quantum state and the quantum state of the training data of the each round of cycle in the $t^{th}$ training to obtain the prediction estimation result of the each round of cycle in the $t^{th}$ training.

A prediction estimation result of an $i^{th}$ round of cycle in the $t^{th}$ training may be determined in the following formula:

$$\Sigma_{c \in W} \alpha_c \langle \psi_c, \phi(x_i) \rangle$$

The second quantum state is represented by $$\sum_{c \in W} \alpha_c \psi_c.$$

Each training includes m rounds of cycles, i being a positive integer less than or equal to m. The training data of each round of cycle is related to the quantity of cycles. For example, for the $i^{th}$ round of cycle, training data of the $i^{th}$ round of cycle is the $i^{th}$ piece of training data.

Exemplarily, for a first round of cycle in the $t^{th}$ training, assuming that the working set used in the $t^{th}$ training includes the following index information: 01, 10, and 11, where 01 represents 1, 10 represents 2, and 11 represents 3, the second vector elements are the first, second, and third vector elements in the initial boundary vector, and a prediction estimation result of the first round of cycle may be obtained through calculation by using the following formula: $\alpha_1 \langle \psi_{01}, \phi(x_1) \rangle + \alpha_2 \langle \psi_{10}, \phi(x_1) \rangle + \alpha_3 \langle \psi_{11}, \phi(x_1) \rangle$.

4. The classical computer generates newly added index information according to the prediction estimation result of the each round of cycle in the $t^{th}$ training.

In an example, the classical computer determines, in response to a prediction estimation result of an $i^{th}$ round of cycle in the $t^{th}$ training being less than a preset threshold, that an $i^{th}$ element in the newly added index information is 1.

In another example, the classical computer determines, in response to the prediction estimation result of the $i^{th}$ round of cycle in the $t^{th}$ training being greater than or equal to the preset threshold, that the $i^{th}$ element in the newly added index information is 0, i being a positive integer.

In an exemplary implementation, the preset threshold is 1. When the prediction estimation result of the $i^{th}$ round of cycle in the $t^{th}$ training is less than 1, the classical computer determines that the $i^{th}$ element in the newly added index information is 1. When the prediction estimation result of the $i^{th}$ round of cycle in the $t^{th}$ training is greater than or equal to 1, the classical computer determines that the $i^{th}$ element in the newly added index information is 0.

The foregoing example is still used. Assuming that the training data set includes three pieces of training data, each training includes three rounds of cycles. If the prediction estimation result of the first round of cycle is 1.1, the first element in the newly added index information is 0. If a prediction estimation result of the second round of cycle is 0.6, the second element in the newly added index information is 1. If a prediction estimation result of the third round of cycle is 0.8, the third element in the newly added index information is 1, that is, the newly added index information is 011.

5. The classical computer adds the newly added index information to the working set.

In this embodiment of this disclosure, an updated working set is used for next training of the classifier. Optionally, after determining the newly added index information, the classical computer transmits a target parameter corresponding to the newly added index information to the QRAM, so that the quantum computer obtains, from the QRAM, training data corresponding to the newly added index information and the target parameter corresponding to the newly added index information.

Still according to the foregoing example, the classical computer adds 011 to the working set, and uses the updated working set for $(t+1)^{th}$ training of the classifier. In an exemplary implementation, when the number of times of training reaches a preset number, the classical computer stops training, and determines the boundary vector obtained during final training as the boundary vector of the classifier.

Figure 8:
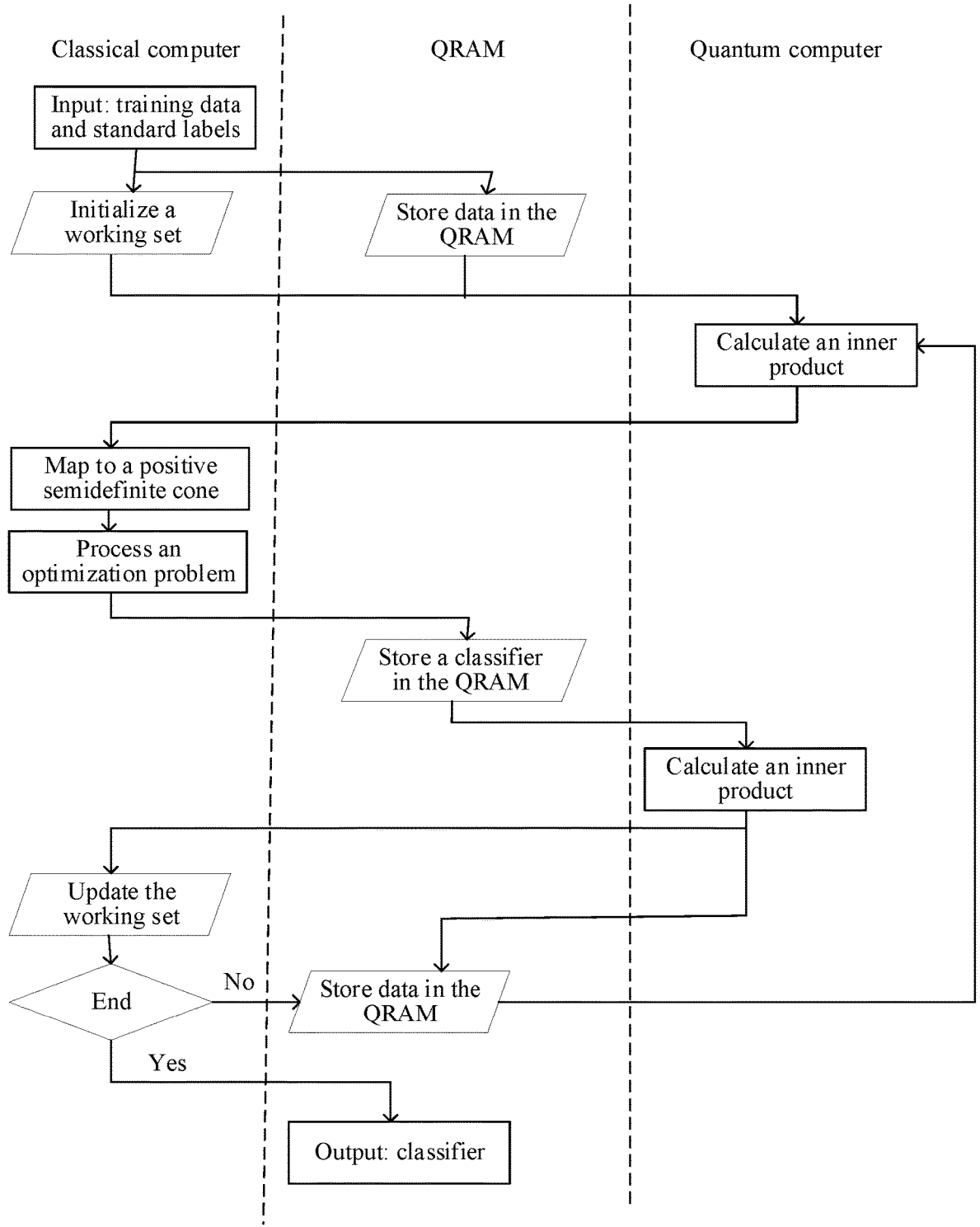
FIG. 8 is a schematic diagram of a classifier training method according to another embodiment of the disclosure.

In an exemplary implementation, FIG. 8 is a schematic diagram of a classifier classification method according to another embodiment of this disclosure. The quantum computer includes a QRAM.

The classical computer obtains a training data set, the training data set including m pieces of training data and standard labels corresponding to the training data. The classical computer initializes the working set, and the working set includes at least one piece of index information. That is, the classical computer randomly selects index information from the working set, and transmits a target parameter corresponding to the index information and m pieces of training data to the QRAM.

The quantum computer calculates an inner product of the quantum states of every two pieces of index information in the working set according to the data stored in the QRAM, and generates an inner product set.

The classical computer generates a matrix according to the inner product set and maps the matrix to a positive semidefinite cone to obtain a positive semidefinite matrix; it generates an optimization problem of a classifier according to the positive semidefinite matrix and the amount of training data, processes the optimization problem, and transmits an obtained initial boundary vector to the QRAM.

The quantum computer determines a prediction estimation result according to the data and the initial boundary vector stored in the QRAM.

The classical computer updates the working set according to the prediction estimation result, and detects whether a training ending condition is met. When the ending condition is met, the classical computer outputs a final classifier (a boundary vector) to the QRAM. When the ending condition is not met, the classical computer stores the training data corresponding to the newly added index information in the QRAM, and performs training again.

In the following system embodiments of this disclosure, for details not disclosed in the system embodiments of this disclosure, refer to the method embodiments of this disclosure.

Figure 9:
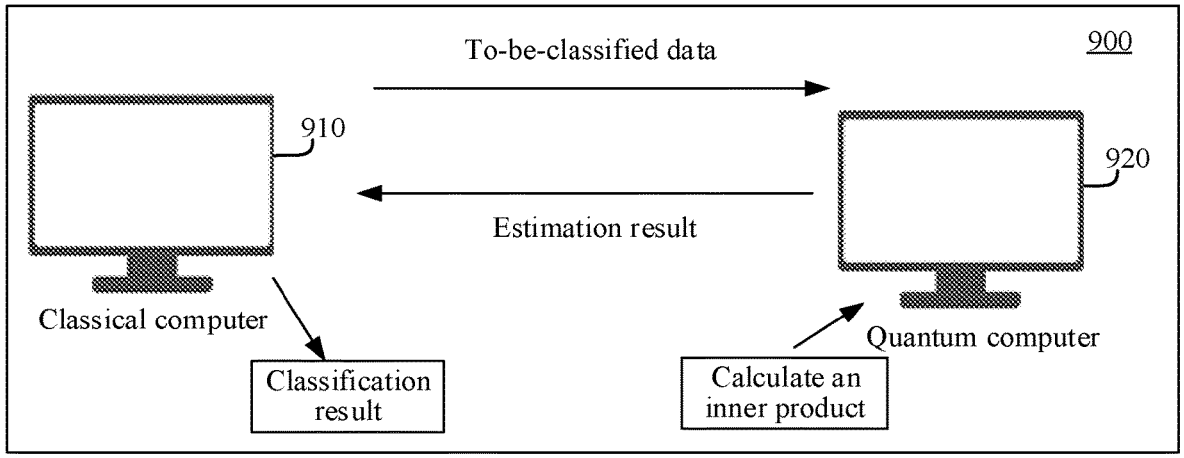
FIG. 9 is a schematic diagram of a data classification system according to an embodiment of the disclosure.

FIG. 9 is a schematic diagram of a data classification system according to an embodiment of this disclosure. The system 900 includes a classical computer 910 and a quantum computer 920.

The classical computer 910 is configured to obtain to-be-classified data, and provide the to-be-classified data to the quantum computer.

The quantum computer 920 is configured to perform feature mapping on the to-be-classified data by using a quantum circuit to obtain a quantum state of the to-be-classified data, determine an estimation result according to a boundary vector of a classifier, the quantum state of the to-be-classified data, and a quantum state of index information corresponding to the boundary vector, and transmit the estimation result to the classical computer 910, the quantum state of the index information corresponding to the boundary vector referring to superposition of feature maps of training data used by the classifier during training.

The classical computer 910 is further configured to determine a classification result corresponding to the to-be-classified data according to the estimation result.

In an exemplary embodiment, the quantum computer 920 is configured to determine a sum of products of each first vector element in the boundary vector and a quantum state of index information corresponding to the each first vector element as a first quantum state.

The quantum computer 920 is configured to determine an inner product between the first quantum state and the quantum state of the to-be-classified data to obtain the estimation result.

In an exemplary embodiment, the quantum computer 920 is configured to determine the quantum state of the to-beclassified data according to a sum of products of each feature value in a feature map of the to-be-classified data and a quantum state corresponding to the feature value by using the quantum circuit.

In an exemplary embodiment, the classical computer 910 is configured to determine, in response to the estimation result being a positive value, that the to-be-classified data pertains to a first category.

The classical computer 910 is configured to determine, in response to the estimation result being a negative value, that the to-be-classified data pertains to a second category.

In an exemplary embodiment, the to-be-classified data includes a character, and the classification result includes a character recognition result corresponding to the character.

Alternatively, the to-be-classified data includes a medical diagnosis image, and the classification result includes an image recognition result corresponding to the medical diagnosis image.

Alternatively, the to-be-classified data includes text information in a social application, and the classification result includes an emotion recognition result corresponding to the text information.

Alternatively, the to-be-classified data includes molecular information, and the classification result includes a property recognition result corresponding to the molecular information.

Alternatively, the to-be-classified data includes material information, and the classification result includes a property recognition result corresponding to the material information.

In summary, in the technical solution provided in this embodiment of this disclosure, the quantum computer determines an estimation result according to a boundary vector of a classifier, a quantum state of to-be-classified data, and a quantum state of index information corresponding to the boundary vector, so that the classical computer determines a classification result corresponding to the to-be-classified data according to the estimation result. The quantum state of the index information corresponding to the boundary vector refers to the superposition of the feature maps of the training data used by the classifier during training. Because the classifier in this disclosure is not limited to using feature maps corresponding to shift-invariant kernels, and there is no limitation on the feature space, the classifier in this disclosure can find a better feature space to classify the to-be-classified data. That is, the boundary vector obtained in this disclosure is more accurate, and the classification precision of the classifier is higher, so that the final classification result is more accurate.

Figure 10:
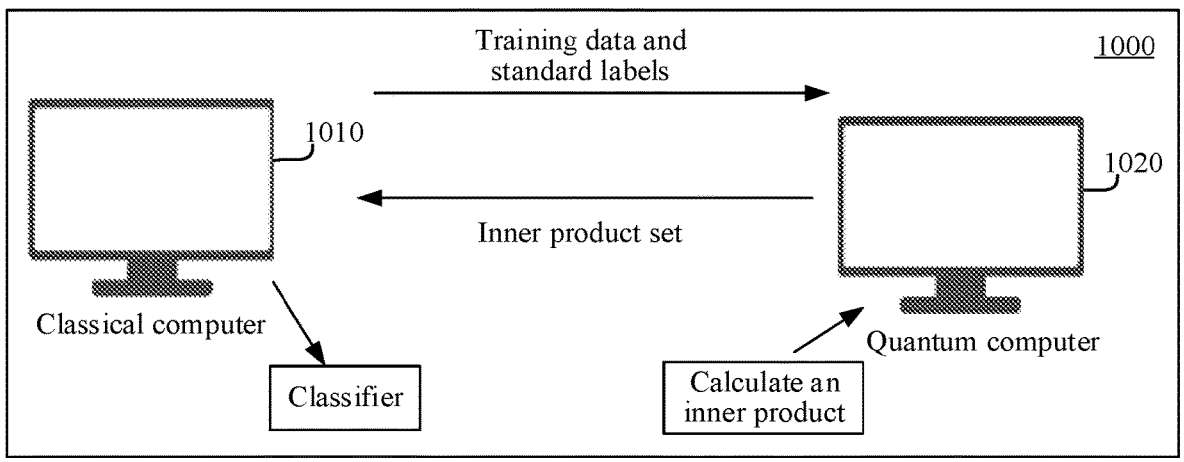
FIG. 10 is a schematic diagram of a classifier training system according to an embodiment of the disclosure.

FIG. 10 is a schematic diagram of a classifier training system according to an embodiment of this disclosure. The system 1000 includes a classical computer 1010 and a quantum computer 1020.

The classical computer 1010 is configured to obtain a training data set, the training data set including m pieces of training data and standard labels corresponding to the training data, m being a positive integer.

The quantum computer 1020 is configured to determine an inner product of quantum states of every two pieces of index information in a working set, and generate an inner product set, the working set including at least two pieces of index information, the index information being used for indicating training data used in current training, the quantum state of the index information referring to superposition of feature maps of the training data used in the current training.

The classical computer 1010 is further configured to generate an optimization problem of a classifier according to the inner product set, and train the classifier according to the optimization problem of the classifier to obtain a boundary vector of the classifier.

In an exemplary embodiment, the classical computer 1010 is configured to select first index information and second index information from the working set, and transmit the m pieces of training data to a QRAM.

The quantum computer 1020 is configured to determine, according to the first index information, first training data from the m pieces of training data stored in the QRAM, determine, according to the second index information, second training data from the m pieces of training data stored in the QRAM, and generate an inner product between a quantum state of the first index information and a quantum state of the second index information according to the first training data, the second training data, the first index information, and the second index information, the first index information being used for indicating the first training data used in current training, the second index information being used for indicating the second training data used in the current training.

In an exemplary embodiment, the quantum computer 1020 is configured to generate the quantum state of the first index information according to the first training data and the first index information.

The quantum computer 1020 is configured to generate the quantum state of the second index information according to the second training data and the second index information.

The quantum computer 1020 is configured to generate the inner product between the quantum state of the first index information and the quantum state of the second index information.

In an exemplary embodiment, the classical computer 1010 is configured to calculate a target parameter according to the first index information, a standard label corresponding to the first training data, an amount m of training data, and a preset constant, and transmit the target parameter to the QRAM.

The quantum computer 1020 is configured to perform feature mapping on the first training data by using a quantum circuit to obtain a quantum state of the first training data, and determine a quantum state of the first index information according to the quantum state of the first training data and the target parameter.

In an exemplary embodiment, the classical computer 1010 is configured to generate a matrix according to the inner product set, and map the matrix to a positive semidefinite cone to obtain a positive semidefinite matrix.

The classical computer 1010 is further configured to generate the optimization problem of the classifier according to the positive semidefinite matrix and the amount m of training data.

In an exemplary embodiment, the classical computer 1010 is further configured to determine an initial boundary vector of the classifier in $t^{th}$ training of the classifier, and provide the initial boundary vector to the quantum computer, t being a positive integer, the initial boundary vector being an initial answer to the optimization problem of the classifier.

The quantum computer 1020 is further configured to determine a prediction estimation result of each round of cycle in the $t^{th}$ training according to a quantum state of training data of the each round of cycle in the $t^{th}$ training, the initial boundary vector, and a quantum state of index information in a working set used in the $t^{th}$ training.

The classical computer 1010 is further configured to generate newly added index information according to the prediction estimation result of the each round of cycle in the $t^{th}$ training; and add the newly added index information to the working set, an updated working set being used for next training of the classifier.

In an exemplary embodiment, the quantum computer 1020 is configured to determine a sum of products of each second vector element in the initial boundary vector and a quantum state of index information corresponding to the each second vector element in the working set used in the $t^{th}$ training as a second quantum state.

The quantum computer 1020 is configured to determine an inner product between the second quantum state and the quantum state of the training data of the each round of cycle in the $t^{th}$ training to obtain the prediction estimation result of the each round of cycle in the $t^{th}$ training.

In an exemplary embodiment, the classical computer 1010 is configured to determine, in response to a prediction estimation result of an $i^{th}$ round of cycle in the $t^{th}$ training being less than a preset threshold, that an $i^{th}$ element in the newly added index information is 1.

The classical computer 1010 is configured to determine, in response to the prediction estimation result of the $i^{th}$ round of cycle in the $t^{th}$ training being greater than or equal to the preset threshold, that the $i^{th}$ element in the newly added index information is 0, i being a positive integer.

Briefly speaking, in the technical solution provided in this embodiment of this disclosure, the classical computer obtains a training data set; the quantum computer calculates an inner product of quantum states of every two pieces of index information in a working set, and generates an inner product set; the classical computer generates an optimization problem of a classifier according to the inner product set, and trains the classifier according to the optimization problem to obtain a boundary vector of the classifier. The quantum state of the index information refers to the superposition of the feature maps of the training data used by the classifier during training. Because the classifier in this disclosure is not limited to using feature maps corresponding to shift-invariant kernels, and there is no limitation on the feature space, the classifier in this disclosure can find a better feature space to classify the to-be-classified data. That is, the boundary vector obtained in this disclosure is more accurate, and the classification precision of the classifier is higher, so that the final classification result is more accurate.

The system and method embodiments provided in the foregoing embodiments belong to the same concept. For the specific implementation process, reference may be made to the method embodiments, and details are not described herein again.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely exemplary embodiments of this disclosure, but are not intended to limit this disclosure. Any modification, equivalent replacement, or improvement and the like made within the spirit and principle of this disclosure fall within the protection scope of this disclosure.

What is claimed is:

1. A data classification method, comprising:
   receiving, by a quantum computer, to-be-classified data, from a classical computer;
   performing, by the quantum computer, feature mapping on the to-be-classified data by using a quantum circuit to obtain a quantum state of the to-be-classified data;
   determining, by the quantum computer, an estimation result according to a boundary vector of a classifier, the quantum state of the to-be-classified data, and a quantum state of index information corresponding to the boundary vector; and
   transmitting, by the quantum computer, the estimation result to the classical computer to determine a classification result corresponding to the to-be-classified data according to the estimation result,
   wherein the quantum state of the index information refers to a superposition of feature maps of training data used by the classifier during training.

2. The method according to claim 1, wherein determining, by the quantum computer, the estimation result according to the boundary vector of a classifier, the quantum state of the to-be-classified data, and the quantum state of index information comprises:
   determining, by the quantum computer, a sum of products of each first vector element included in the boundary vector and a corresponding piece of quantum state of index information as a first quantum state; and
   determining, by the quantum computer, an inner product between the first quantum state and the quantum state of the to-be-classified data to obtain the estimation result.

3. The method according to claim 1, wherein performing, by the quantum computer, the feature mapping on the to-be-classified data by using the quantum circuit to obtain the quantum state of the to-be-classified data comprises:
   determining, by the quantum computer, the quantum state of the to-be-classified data according to a sum of products of each feature value in a feature map of the to-be-classified data and a corresponding quantum state by using the quantum circuit.

4. The method according to claim 1, wherein transmitting, by the quantum computer, the estimation result to the classical computer to determine the classification result corresponding to the to-be-classified data according to the estimation result comprises transmitting, by the quantum computer, the estimation result to the classical computer to categorize, by the classical computer, the to-be-classified data in response to whether the estimation result being a positive value or a negative value.

5. The method according to claim 1, wherein:
   the to-be-classified data comprises a character, and the classification result comprises a character recognition result corresponding to the character; or
   the to-be-classified data comprises a medical diagnosis image, and the classification result comprises an image recognition result corresponding to the medical diagnosis image; or
   the to-be-classified data comprises text information in a social application, and the classification result comprises an emotion recognition result corresponding to the text information; or
   the to-be-classified data comprises molecular information, and the classification result comprises a property recognition result corresponding to the molecular information; or the to-be-classified data comprises material information, and the classification result comprises a property recognition result corresponding to the material information.

6. A classifier training method, comprising:
obtaining, by a classical computer, a training data set, the training data set comprising m pieces of training data and standard labels corresponding to the m pieces of training data, m being a positive integer;
providing a working set comprising at least two pieces of index information, the index information being used for indicating training data used in current training;
determining, by a quantum computer, an inner product of quantum states of every two pieces of index information in the working set to generate an inner product set, wherein the quantum state of the index information refers to a superposition of feature maps of the training data used in the current training; and
generating, by the classical computer, an optimization problem of a classifier according to the inner product set to train the classifier according to the optimization problem of the classifier to obtain a boundary vector of the classifier.

7. The method according to claim 6, wherein determining, by the quantum computer, an inner product of quantum states of every two pieces of index information in the working set to generate the inner product set comprises:
selecting, by the classical computer, first index information and second index information from the working set, and transmitting the m pieces of training data to a quantum random access memory (QRAM); and
determining, by the quantum computer according to the first index information, first training data from the m pieces of training data stored in the QRAM;
determining, according to the second index information, second training data from the m pieces of training data stored in the QRAM; and
generating, by the quantum computer, an inner product between a quantum state of the first index information and a quantum state of the second index information according to the first training data, the second training data, the first index information, and the second index information.

8. The method according to claim 7, wherein generating, by the quantum computer, the inner product between the quantum state of the first index information and the quantum state of the second index information according to the first training data, the second training data, the first index information, and the second index information comprises:
generating, by the quantum computer, the quantum state of the first index information according to the first training data and the first index information;
generating, by the quantum computer, the quantum state of the second index information according to the second training data and the second index information; and
generating, by the quantum computer, the inner product between the quantum state of the first index information and the quantum state of the second index information.

9. The method according to claim 8, wherein generating, by the quantum computer, the quantum state of the first index information according to the first training data and the first index information comprises:
transmitting a target parameter to the QRAM by calculating, by the classical computer, the target parameter according to the first index information, standard labels corresponding to the first training data, an amount m of the training data, and a preset constant;
performing, by the quantum computer, feature mapping on the first training data by using a quantum circuit to obtain a quantum state of the first training data; and
determining the quantum state of the first index information according to the quantum state of the first training data and the target parameter.

10. The method according to claim 6, wherein generating, by the classical computer, the optimization problem of the classifier according to the inner product set comprises:
generating, by the classical computer, a matrix according to the inner product set;
mapping the matrix to a positive semidefinite cone to obtain a positive semidefinite matrix; and
generating, by the classical computer, the optimization problem of the classifier according to the positive semidefinite matrix and the amount m of training data.

11. The method according to claim 6, further comprising:
determining, by the classical computer, an initial boundary vector of the classifier in $t^{th}$ training of the classifier;
providing the initial boundary vector to the quantum computer, t being a positive integer, the initial boundary vector being an initial answer to the optimization problem of the classifier;
determining, by the quantum computer, a prediction estimation result of each round of cycle in the $t^{th}$ training according to a quantum state of training data of the each round of cycle in the $t^{th}$ training, the initial boundary vector, and a quantum state of index information in a working set used in the $t^{th}$ training; and
generating, by the classical computer, newly added index information according to the prediction estimation result of the each round of cycle in the $t^{th}$ training; and
adding the newly added index information to the working set, an updated working set being used for next training of the classifier.

12. The method according to claim 11, wherein determining, by the quantum computer, the prediction estimation result of the each round of cycle in the $t^{th}$ training according to the quantum state of training data of the each round of cycle in the $t^{th}$ training, the initial boundary vector, and the quantum state of index information in a working set used in the $t^{th}$ training comprises:
determining, by the quantum computer, a sum of products of each second vector element in the initial boundary vector and a corresponding quantum state of index information in the working set used in the $t^{th}$ training as a second quantum state; and
determining, by the quantum computer, an inner product between the second quantum state and the quantum state of the training data of the each round of cycle in the $t^{th}$ training to obtain the prediction estimation result of the each round of cycle in the $t^{th}$ training.

13. The method according to claim 11, wherein generating, by the classical computer, the newly added index information according to the prediction estimation result of the each round of cycle in the $t^{th}$ training comprises:
determining, by the classical computer in response to a prediction estimation result of an $i^{th}$ round of cycle in the $t^{th}$ training being less than a preset threshold, that an $i^{th}$ element in the newly added index information is 1; and
determining, by the classical computer in response to the prediction estimation result of the $i^{th}$ round of cycle in the $t^{th}$ training being greater than or equal to the preset threshold, that the $i^{th}$ element in the newly added index information is 0, i being a positive integer.

14. A data classification system, comprising:
a classical computer configured to obtain to-be-classified data and determine a classification result corresponding to the to-be-classified data according to an estimation result; and
a quantum computer, including a quantum circuit, the quantum computer being configured to:
  receive the to-be-classified data from the classical computer;
  perform feature mapping on the to-be-classified data by using the quantum circuit to obtain a quantum state of the to-be-classified data;
  determine the estimation result according to a boundary vector of a classifier, the quantum state of the to-be-classified data, and a quantum state of index information corresponding to the boundary vector; and
  transmit the estimation result to the classical computer, wherein the quantum state of the index information refers to a superposition of feature maps of training data used by the classifier during training.

15. The data classification system of claim 14, wherein the quantum computer is configured to determine the estimation result according to the boundary vector of a classifier, the quantum state of the to-be-classified data, and the quantum state of index information by performing steps comprising:
  determining a sum of products of each first vector element included in the boundary vector and a corresponding piece of quantum state of index information as a first quantum state; and
  determining an inner product between the first quantum state and the quantum state of the to-be-classified data to obtain the estimation result.

16. The data classification system of claim 14, wherein the quantum computer is configured to perform, the feature mapping on the to-be-classified data by using the quantum circuit to obtain the quantum state of the to-be-classified data by performing steps comprising:
  determining the quantum state of the to-be-classified data according to a sum of products of each feature value in a feature map of the to-be-classified data and a corresponding quantum state by using the quantum circuit.

17. The data classification system of claim 14, wherein the classical computer is configured to determine the classification result corresponding to the to-be-classified data according to the estimation result by performing a step comprising:
  categorizing the to-be-classified data in response to whether the estimation result being a positive value or a negative value.

18. The data classification system of claim 14, wherein
the to-be-classified data comprises a character, and the classification result comprises a character recognition result corresponding to the character; or
the to-be-classified data comprises a medical diagnosis image, and the classification result comprises an image recognition result corresponding to the medical diagnosis image; or
the to-be-classified data comprises text information in a social application, and the classification result comprises an emotion recognition result corresponding to the text information; or
the to-be-classified data comprises molecular information, and the classification result comprises a property recognition result corresponding to the molecular information; or
the to-be-classified data comprises material information, and the classification result comprises a property recognition result corresponding to the material information.

19. The data classification system of claim 14, further comprising a quantum random access memory (QRAM) in communication with the classical computer and the quantum computer and being configured to store the to-be-classified data.

20. The data classification system of claim 19, wherein the QRAM is disposed inside the quantum computer.

* * * * *